April 15, 1924.  
C. G. TROSIEN  
GEAR LOCK FOR AUTOMOBILES  
Filed March 22, 1923 2 Sheets-Sheet 1
1,490,685
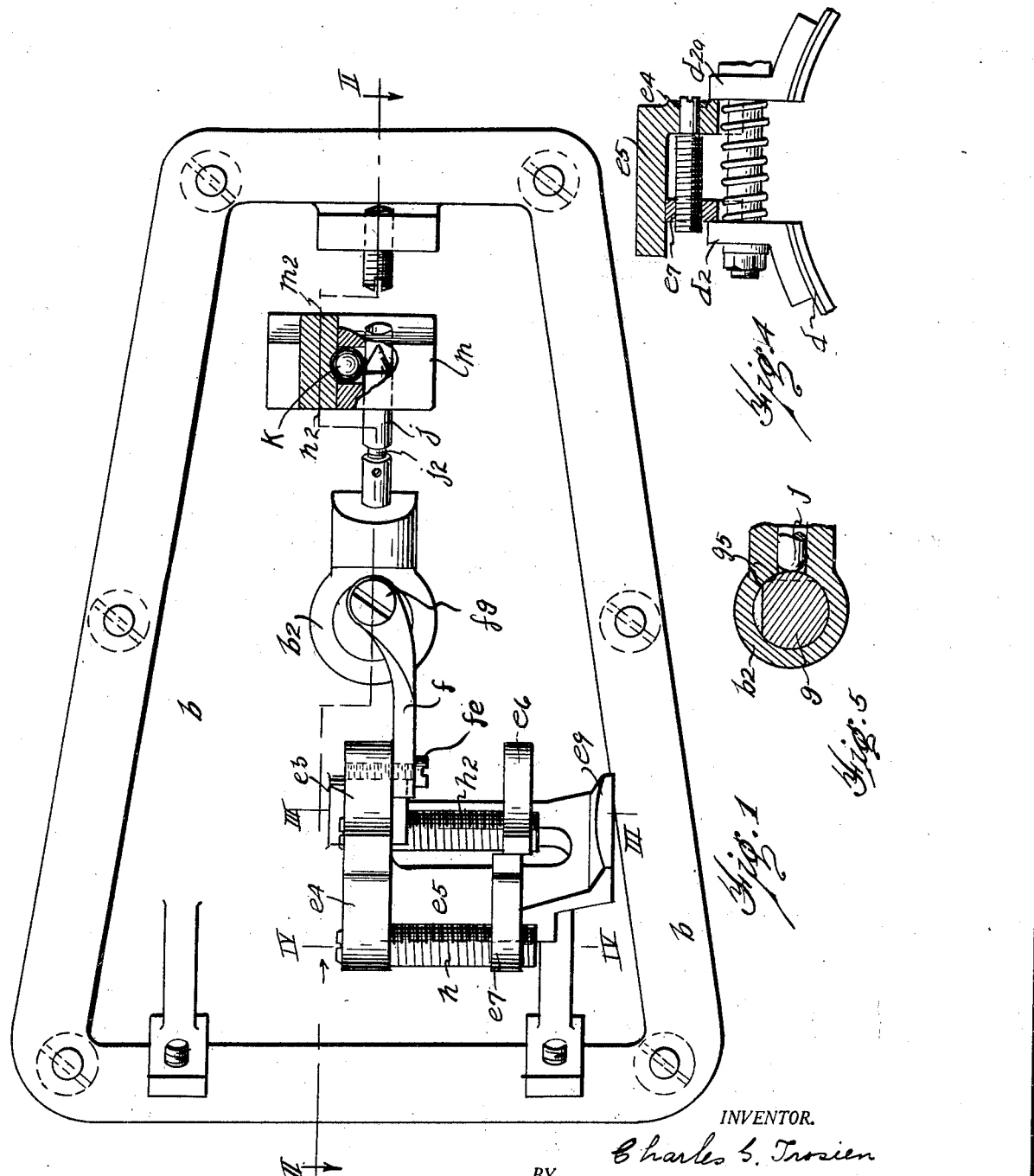
INVENTOR.  
Charles G. Trosien  
BY  
Ralzemond A. Parker  
ATTORNEY.

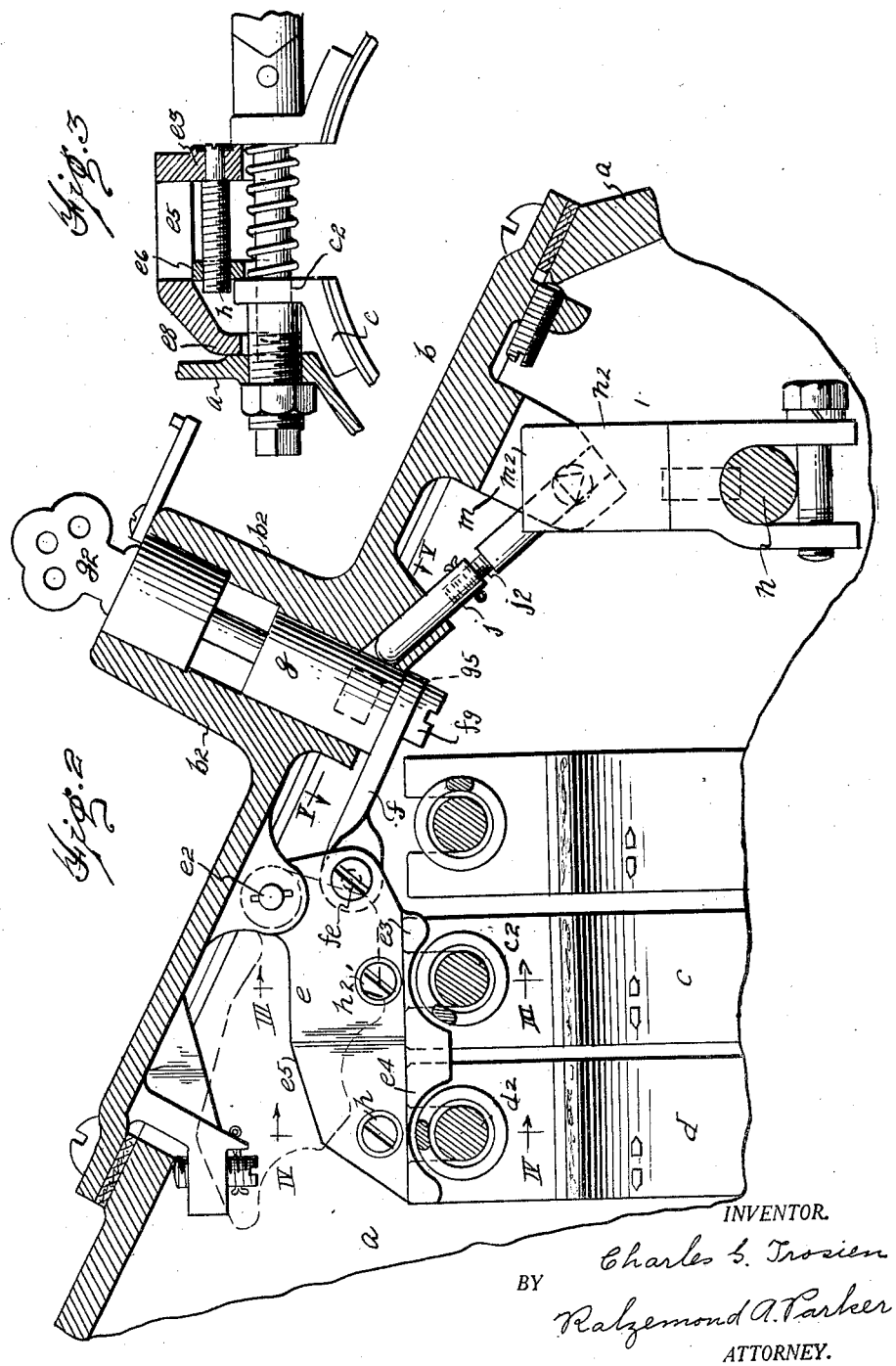

Patented Apr. 15, 1924.

1,490,685

UNITED STATES PATENT OFFICE.

CHARLES G. TROSIEN, OF PONTIAC, MICHIGAN.

GEAR LOCK FOR AUTOMOBILES.

Application filed March 22, 1923. Serial No. 626,723.

*To all whom it may concern:*

Be it known that I, CHARLES G. TROSIEN, a citizen of the United States, residing at Pontiac, county of Oakland, State of Michigan, have invented a certain new and useful Improvement in Gear Locks for Automobiles, and declare the following to be a full, clear, and exact description of the same, such as will enable others skilled in the art to which it pertains to make and use the same, reference being had to the accompanying drawings, which form a part of this specification.

My invention relates to gear locks for automobiles, and an object of my improvements is to provide an improved apparatus for locking the gearing of a Ford automobile.

My present invention is in part an improvement upon the invention patented to me May 2, 1922, in United States Letters Patent #1,414,716.

In the accompanying drawings,—

Figure 1 is a plan view of the cover of the change-speed gearing of a Ford automobile removed from the casing and inverted, showing my locking apparatus secured thereto.

Fig. 2 is a section through the upper portion and cover of a Ford automobile showing my locking apparatus in its operative position upon the machine.

Fig. 3 is a section on the line III—III, Figs. 2 and 1, looking in the direction of the arrows in Fig. 2.

Fig. 4 is a section on the line IV—IV, Figs. 2 and 1, looking in the direction of the arrows in Fig. 2.

Fig. 5 is a section on the line V—V, Fig. 2.

$a$ is the gear casing and $b$ is the cover therefor. $b^2$ is an annular lug rising above the cover $b$ and integral therewith. The bore of the lug $b^2$ extends through the cover $b$. $c$ is the brake band to the slow-speed ahead gearing and $d$ is the brake band to the reverse gearing. $c^2$ is a lug on the end of the brake band $c$ and $d^2$ is a lug upon the end of the brake band $d$. $e$ is a shoe pivoted at $e^2$ to the lug extending downward from the cover $b$. The shoe $e$ has a substantially horizontal flat part $e^5$ and integral with said flat part and upon one side of the same is a depending flange constituting engaging lugs $e^3$ and $e^4$. $h$ is a horizontal screw-threaded rod, one end of which engages in a bearing in the lug $e^4$ that is rotatable therein. $h^2$ is a second screw-threaded rod extending parallel to the rod $h$, one end engaging and rotatable in a bearing $e^3$. $e^6$ is a movable lug screw-threaded upon the end of the rod $h^2$ at a distance from the lug $e^3$ and $e^7$ is a similar lug screw-threaded upon the rod $h$ at a distance from the rod $e^4$. Each of the lugs $e^6$ and $e^7$ engages at one edge upon the surface of the part $e^5$ of the shoe so that said lugs may slide but may not turn. The ends of the rods $h$ and $h^2$ adjacent to the lugs $e^4$, $e^3$ are provided with kerfs in which a screw-driver may engage to turn said rods. By turning the rods $h$ and $h^2$ the distance of the lugs $e^6$, $e^7$ from the lugs $e^3$, $e^4$ may be adjusted at will. $e^8$ is a finger extending downward from one side of the part $e^5$ of the shoe $e$ and engaging against the side of the casing $a$.

$g$ is a cylindrical part or barrel connected to the rotatable part of a pin lock which may be manipulated by means of a key $g^2$. The barrel $g$ fits and is adapted to rotate in the bore of the lug $b^2$ with its lower end just below the lower end of the walls of said bore. $f$ is a connecting rod pivoted at $fe$ to the shoe $e$ and at $fg$ by an eccentric pivot to the lower end of the barrel $g$. By rotating the barrel $g$ the shoe $e$ is oscillated about its pivot $e^2$ to raise the lugs $e^3$, $e^4$, $e^6$, $e^7$ out of the line of motion of the ends of the brake bands $c$ and $d$, or to allow said lugs to fall and interpose themselves in the line of travel of the lugs upon the ends of said bands so that the bands cannot be tightened upon their respective drums.

$n$ is the clutch shaft and $n^2$ is a worm secured to said shaft and extending upward therefrom. $m$ is a lug extending downward from the lower surface of the cover plate $b$ and provided with a slot $m^2$ therein. The lever arm $n^2$ has a flat upper end adapted to fit and reciprocate in the slot $m^2$. $k$ is a ball fitting and adapted to reciprocate in a horizontal aperture in the lug $m$ communicating with the slot $m^2$.

$j$ is a rod adapted to fit and reciprocate in an aperture in the lug $m$ and in an aperture in the wall surrounding the bore of the lug $b^2$ at the lower end thereof. $j^2$ is a turnbuckle device by which the length of the rod $j$ may be adjusted. The aperture in which the ball $k$ reciprocates extends at right angles to the aperture in which the rod $j$ reciprocates in the lug $m$ and communicates therewith, and the relative position of said ball and rod and the size thereof is such that when the rod $j$ is at its lower position it forces the ball $k$ into the slot $m^2$ where it engages a cavity in the arm $n^2$ and prevents the motion of the clutch lever.

$g^5$ (Fig. 5) is a cut-away portion of the barrel $g$. When this cut-away portion is opposite the rod $j$, said rod may move upward to allow the ball $k$ to move into its aperture and permit the movement of the clutch lever. When the cylindrical portion of the barrel $g$ is opposite the rod $j$, said rod is forced downward and engages the ball $k$ with the arm $n^2$, as above described.

The operation of the above described device is as follows: When the barrel $g$ is turned by the key $g^2$ to a position to raise the shoe $e$ above the lugs of the bands $c$ and $d$, the cut-away portion $g^5$ of the barrel $g$ is opposite the rod $j$ and the clutch may be freely operated. When said barrel is turned to lower the shoe $e$ until the lugs on said shoe are interposed between the lugs upon the bands $c$ and $d$, then the cylindrical part of the barrel $g$ is opposite the rod $j$ and said rod is forced downward, forcing the ball $k$ into engagement with the arm $n^2$ and preventing the operation of the clutch.

The threaded rods $h$ and $h^2$ permit of the adjustment of the position of the lugs $e^6$ and $e^7$ so that they shall always be properly located relative to their engaging lugs upon the bands $c$ and $d$ and when the lugs upon the bands are moved in adjusting the bands, the lugs $e^6$ and $e^7$ upon said shoe may be correspondingly adjusted.

What I claim is:

1. In a change-speed gearing having a brake band as one of its operative elements, a stop adapted to be interposed in the line of movement of one end only of said band, means for interposing said stop in the line of travel of the end of said band and removing it therefrom at will, and means for adjusting the position of said stop in the direction of the line of movement of the end of said band.

2. In a change-speed gearing having a brake band as one of its operative elements, a shoe having independently adjustable lugs thereon adapted to be interposed between the ends of said band and removed therefrom, and means for adjusting one of said lugs.

3. In a change-speed gearing having a brake band as one of its operative elements, a shoe having lugs thereon adapted to be interposed between the ends of said band and removed therefrom, and a screw-threaded rod bearing in a lug upon one side of said shoe and having screw-threads engaging threads in an aperture in the other lug, said second lug being adjustable by the rotation of said screw-threaded rod.

4. In an apparatus of the kind described, a gear casing, a shoe pivoted to said casing and adapted to oscillate in a vertical plane, a barrel fitting and adapted to rotate in an aperture passing through the wall of said casing, and a connecting rod pivoted to said shoe at a distance from the pivot of said shoe at one end and at the other end pivoted eccentrically to the end of said barrel.

5. In an apparatus of the kind described, a gear casing, a shoe pivoted to said casing and adapted to oscillate in a vertical plane, a barrel fitting and adapted to rotate in an aperture passing through the wall of said casing, a connecting rod pivoted to said shoe at a distance from the pivot of said shoe at one end and at the other end pivoted eccentrically to the end of said barriel, a clutch operating apparatus, and means whereby the rotation of said barrel shall lock said clutch operating apparatus.

6. In an apparatus of the kind described, a gear casing, an aperture extending through the wall of said casing, a barrel adapted to rotate in said aperture, a clutch shaft in said casing, a lug extending from the wall of said casing having a slot therein, an arm extending from said shaft and reciprocating in said slot, a rod adapted to reciprocate in an aperture in said lug, an aperture extending in from said slot and communicating with the aperture in which said rod reciprocates, a ball in said last-mentioned aperture, said rod extending to a position to have its end engaged by said barrel, and a cam upon said barrel adapted to actuate said rod, said rod being adapted to force said ball into engagement with said arm to lock the same or to release it therefrom.

7. In an apparatus of the kind described, a gear casing, an aperture extending through the wall of said casing, a barrel adapted to rotate in said aperture, a clutch shaft in said casing, a lug extending from the wall of said casing having a slot therein, an arm extending from said shaft and reciprocating in said slot, a rod adapted to reciprocate in an aperture in said lug, an aperture extending in from said slot and communicating with the aperture in which said rod reciprocates, a ball in said last-mentioned aperture, said rod extending to a position to have its end engaged by said barrel, a cam upon said barrel adapted to actuate said rod, said rod being adapted to force said ball into engagement with said arm to lock the same or to release it therefrom, and means for adjusting the length of said rod.

8. In an apparatus of the kind described, a gear casing, an aperture extending through the wall of said casing, a barrel adapted to rotate in said aperture, a clutch shaft in said casing, a lug extending from the wall of said casing having a slot therein, an arm extending from said shaft and reciprocating in said slot, a rod adapted to reciprocate in an aperture in said lug, an aperture extending in from said slot and communicating with the aperture in which said rod reciprocates, a ball in said last-mentioned aperture, said rod extending to a position to have its end engaged by said barrel, and a cam upon said barrel adapted to actuate said rod, said rod being adapted to force said ball into engagement with said arm to lock the same or to release it therefrom, and a gear locking apparatus, said barrel being adapted to actuate said gear locking apparatus.

In testimony whereof, I sign this specification.

CHARLES G. TROSIEN.